A. P. ANDERSON.
METHOD OF PEBBLING STARCH MATERIALS.
APPLICATION FILED JULY 11, 1912.
1,129,440.
Patented Feb. 23, 1915.
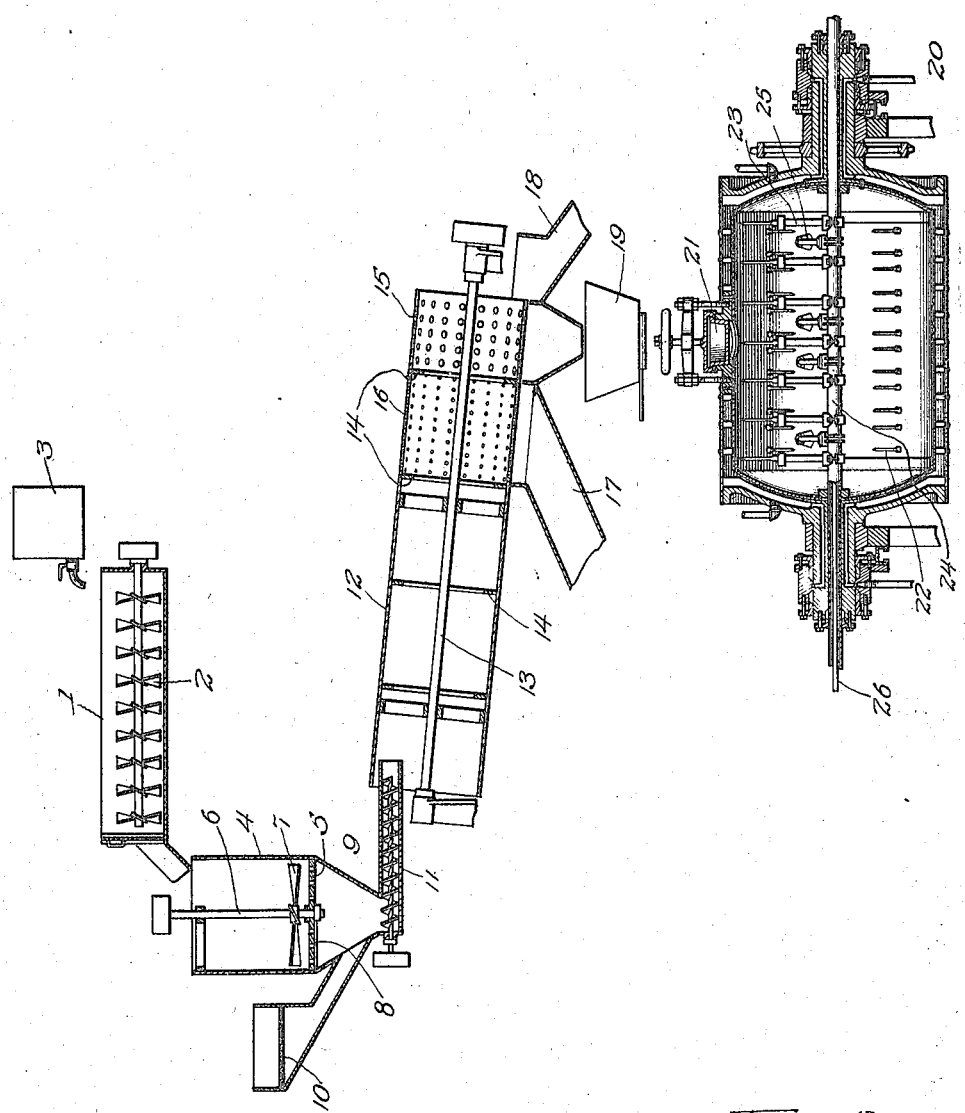
Witnesses:
Arthur Carlson
Charles G. Cope
Inventor
Alexander Pierce Anderson
by Jones, Addington, Ames & Seibold
Attys.

UNITED STATES PATENT OFFICE.

ALEXANDER P. ANDERSON, OF CHICAGO, ILLINOIS.

METHOD OF PEBBLING STARCH MATERIALS.

1,129,440.
Specification of Letters Patent.
Patented Feb. 23, 1915.

Application filed July 11, 1912. Serial No. 708,895.

*To all whom it may concern:*

Be it known that I, ALEXANDER PIERCE ANDERSON, a citizen of the United States, residing at Chicago, in the county of Cook and State of Illinois, have invented new and useful Improvements in Methods of Pebbling Starch Materials, of which the following is a full, clear, concise, and exact description, reference being had to the accompanying drawing, forming a part of this specification.

My invention relates to a method of converting starch or starch-containing material into pebble-like lumps or pellicles.

The process consists generally in taking starch or starch-containing material, having sufficient moisture to render the same doughy or plastic, and dividing the same into pieces or small masses, and then subjecting such pieces or masses to a heating and tumbling action to convert the same into pebble-like lumps or pellicles which are sufficiently hard to stand handling or transportation without breaking.

The process may be practised with any suitable apparatus, such, for example, as that more or less diagrammatically depicted in the drawing.

In the drawing, 1 indicates a suitable mixing machine having a stirrer or mixer 2 by means of which material which is too dry, such, for example, as corn flour or dry starch, may be mixed with water supplied from a tank 3 in suitable quantity to bring the material up to the desired water-content. The rotation of the stirrer 2, which may be driven in any suitable manner, agitates the material and water to thoroughly mix the same and disseminate the moisture uniformly throughout the mass to reduce the material to a dough-like or plastic condition. From the mixing machine 1 the material is conveyed, either directly or indirectly, to a tank 4 which is provided with a reticulated bottom 5, the openings being of any suitable size, say from $\frac{1}{16}$ to $\frac{1}{2}$ inch in diameter, although the openings may be even smaller or larger if desired. The tank 4 is provided with a vertical shaft 6 having adjacent the bottom 5 one or more blades or vanes 7, set spirally so as to press or squeeze the dough-like or plastic material by mechanical pressure through the openings in the bottom plate 5, the material exuding in string-like formation. Fixed to the shaft 6 beneath the bottom 5 is a blade or knife 8. This blade or knife bears against the bottom 5 and by reason of its rotation cuts off the strings of dough as they exude through the perforated bottom 5. The speed of the shaft 6, which may be driven in any suitable manner, is preferably such that the strings of dough-like or plastic material are cut into lengths substantially the diameter of the same. Thus if the openings are about $\frac{1}{16}$ inch in diameter the knife travels at such speed that the subdivided pieces will be about the same length. While but one knife or cutter is shown, any number may be employed, it being obvious that the greater the number of knives the smaller the pieces will be.

The material, cut into pieces or small masses, falls into a chute 9 beneath the tank 4, and as these pieces drop therethrough, flour, preferably made from the same material as that being treated, is fed into the chute 9, such flour being intended for giving the plastic pieces a slight coating, sufficient to prevent the masses from sticking together as they otherwise would be apt to do owing to their dough-like condition. The flour may be fed by hand, or in any suitable manner, as by means of a dry flour feeder 10.

The material falls from the chute 9 into a screw-conveyer 11 which extends into the open end of a cylinder 12. During the passage of the dough-like pieces through the conveyer 11 they are tumbled about more or less and this action serves to cover the pieces uniformly with the flour and also to assist in separating any masses or pieces that may have adhered together.

The cylinder 12 is inclined and mounted upon a suitable shaft 13 which is adapted to be slowly rotated in any suitable manner to rotate the cylinder. This cylinder is provided with suitably spaced internal flanges or ribs 14, the purpose of which is to retard the movement of the pieces or small masses toward the outlet end of the cylinder. At the outer end, as at 15, the wall of the cylinder is provided with openings of about the size it is desired that the masses subjected to further treatment shall have, while next to the portion 15 the wall of the cylinder, as at 16, is provided with openings of smaller size, so that while the graded lumps or masses will pass to the section 15, any flour and smaller particles of dough will tail off through the openings at 16 and escape through a suitable chute 17 to a bin to be subsequently worked over again. Any lumps or masses that are too large will escape the openings in the portion 15 of the cylinder and finally drop out of the end and fall through a chute 18 into a suitable bin which may be the same as that into which fall the tailings from the section 16 of the cylinder. A bin 19 receives the graded pieces that pass through the openings in the portion 15 of the cylinder. As the cylinder 12 is set at an incline and is being slowly rotated, it is obvious that the flour-coated plastic masses or pieces will gradually travel toward the lower or discharge end of the cylinder, meanwhile being tumbled or rolled about. This rolling action serves to smooth or round off the irregularities of the dough masses, so that when they reach the portion 15 of the cylinder they are round-like in shape, and being graded in size by passing through the openings in the portion 15 are ready for the pebbling operation. This pebbling operation is performed in a suitable drum or cooker 20 which may be of any suitable character but which in the drawing is like that forming the subject-matter of a patent granted to me August 20th, 1912, No. 1,035,842. The drum 20 is provided with a hollow hinged lid 21, and is also steam-jacketed to provide means for applying heat to the contents of the drum. The drum is mounted so as to be rotated and provision is made for supplying steam to the steam jacket and the hollow lid, and, if desired, to the interior of the drum, during rotation of the same. The interior of the drum is provided with hollow stirrer pipes 22 which communicate with the steam jacket, while what I term breaker pipes, designated 23, which are also hollow, communicate with a central axial pipe 24, provision being made for turning this pipe axially so as to turn the breaker pipes down into the material to break up any large masses should such form, these breaker pipes, when turned down into the material, coöperating with the stirrer pipes 22 for this purpose. Steam may be supplied to the interior of the drum, should this be desired, by means of hooded pipes 25 which are connected with a second pipe 26, co-axial with and located within the pipe 24. Suitable steam supply connections are made with the pipes 24 and 26, and the pipe 26 may, if desired, also be connected with a vacuum pump, whereby the interior of the drum may be exhausted to any desired degree of vacuum, suitable valves of course being provided for making the proper connections, all as more fully described in the patent heretofore referred to.

Having described one suitable form of apparatus by means of which the present process may be carried into effect, I shall now describe how the process is operated.

The raw material which is to be converted into pebble-like lumps according to my process should be dough-like or plastic. Thus while it may not be in the form of dough, it must be at least plastic and have sufficient tenacity to cling together when molded or kneaded. Such material, for instance, as green starch may be in this condition when taken for the raw material in carrying out my process, while other materials, such as flours made from cereal grains, will need to have water added to give them the right consistency. Other starch materials, such for example as potatoes or bananas, after being reduced to a pulp, may need to be dried out somewhat, to reduce them to the right consistency. Whatever the material, whether flours, starch, legumes, fruit, etc., it must initially either have sufficient moisture to render it doughy or plastic when kneaded or molded, or it must have sufficient moisture added to put it in such doughy or plastic condition.

The process may be employed for converting pure starch, or starch-containing flours, such as flours made from corn, wheat, rice or other starch-containing materials, such as bananas, white and sweet potatoes, peas, beans, lentils, cassava, sago and tapioca, and various other starch-containing cereals, fruits and legumes.

The nature of the invention will be more readily understood by reference to a specific example of the process, taking, for example, the treatment of corn flour. In converting corn flour into pebble-like lumps according to the present process, the proceeding is as follows. The corn is ground, preferably being reduced to a pulverized condition and also preferably having the germ and hull removed. It is not necessary that all of the corn be pulverized. For example, some of the material may be in the form of fine grits without interfering with the successful operation of the process. Referring to the apparatus illustrated in the drawing, this corn flour is put into the mixer 1 and a sufficient quantity of water added to bring the moisture content up to about 40 to 45 per cent. This flour and water is thoroughly agitated and mixed so that the moisture is uniformly disseminated throughout the mass. With this content of moisture the result will be a doughy or plastic mass, assuming the mixing to have been properly done. While a moisture content of about 40 to 45 per cent. is mentioned, it is to be observed that this content may vary within reasonable limits without affecting the result. The doughy mass is then put into the tank 4 and by reason of the action of the blades or wings 7 therein the mass is forced by pressure through the reticulated bottom plate 5, exuding therefrom in the form of strings of dough, somewhat as potato comes from a potato ricer. As the doughy mass exudes from the reticulated plate 5, the knife 8, which is constantly rotating, subdivides the dough strings into pieces or small masses, which then drop into the chute 9, to which flour is supplied from the dry flour feeder 10. The dough-like pieces and flour fall into the conveyer 11, the screw conveyer of which tumbles the pieces about, uniformly coating them with the flour. In view of the fact that the material at this stage of the operation contains about 40 to 45 per cent. moisture, and is therefore somewhat sticky, the small masses or particles would, if not coated with flour tend to stick or run together. This flour coating prevents this and insures the individuality of the divided pieces or masses.

The flour-coated dough-like pieces or masses are, by the action of the conveyer 11, discharged into the cylinder 12. This cylinder is in continuous rotation at a slow rate of speed and as it rotates the flour-coated doughy pieces or masses are rolled or tumbled about, and also, owing to the inclination of the cylinder, are caused to travel slowly toward the discharge end. This rolling action causes the rough and irregular surfaces of the individual pieces to be rounded or smoothed off, making the small masses or pieces round-like in shape. Any flour and small particles that enter the cylinder pass through the openings in the portion 16 of the cylinder, while the pieces that are larger than the desired size pass out at the end of the cylinder. These tailings are conveyed to a suitable bin and may be worked over again. Lumps of the proper size pass through the openings in the portion 15 of the cylinder and fall into the bin 19 from which they are transferred to the apparatus in which the pebbling operation takes place. In this connection it may be observed that while in practice it is preferred to use the rotating cylinder 12, this cylinder having for its purpose to give uniformity in size to the product, dust or particles which are too small being eliminated by means of the perforated portion 16 of the cylinder, while the lumps which are too large pass out through the end of the cylinder, it is to be understood that this is not essential, inasmuch as all of the doughy or plastic pieces or masses may be carried through the process irrespective of their size. By employing the cylinder 12 or any other device for accomplishing a similar result substantial uniformity in the size of the final product may be insured. A suitable quantity of the flour-coated, dough-like masses, say enough to fill the drum 20 from one-fourth to one-half full, is then put into the drum and subjected to heat and also to a tumbling action. In this operation the contents of the drum are heated by means of the steam in the jacket of the drum, pressure thus forming in the drum due to the vaporization of the moisture in the material. The temperature of the material is raised to about 160° F. (equivalent to about five pounds pressure) or higher, up to, say, 225° F. (equivalent to about nineteen pounds pressure); in any event being high enough to gelatinize more or less of the starch in the doughy pieces or masses. With the material in a cold state it will require from about one to three hours to bring the temperature up to the desired degree, depending upon whether the material is to be heated to 160° or 225°. This gelatinized starch, the extent of which depends upon the temperature to which the material is heated and the duration of treatment, forms a binder which serves to cement or bind the particles in the pieces or masses together, and the tumbling action to which these particles are subjected serves to insure uniform heating to harden the pebbles and make them more compact, and due to the hot walls of the drum, imparts to the lumps a crust-like hardened periphery. During this heating and tumbling action to form the doughy pieces into pebbles, the drum is preferably closed air-tight, the steam inlet to the interior of the drum being closed. The stirrer pipes, which are likewise heated, being hollow and filled with steam, serve to stir the mass, and are sufficient under ordinary circumstances to prevent the individual doughy pieces from adhering or sticking together. Should, however, any of the individual pieces collect and form into collected masses, the breaker pipes 23 may be turned down into the material so as to break up such collected masses.

The material should be subjected to the heating and tumbling action for a sufficient length of time to produce pebbles or pellet-like lumps which are sufficiently hard to stand handling and transportation when removed from the drum. If corn flour treated in the manner described be heated up to a pressure of from five to eight pounds, which is equivalent to a temeprature of about 160° to 180°, the resulting pebbles will be sufficiently hard to stand handling and transportation but will break down or dissolve in water. If the material be heated to, say 225° F., the resulting product will have the contained starch substantially completely gelatinized and the pebble-like lumps will be hard and horny throughout and have unbroken polished or glassy surfaces. The pebbles will not dissolve but when placed in water will absorb it slowly and swell up somewhat. Variations in the moisture content, the degree of heat, and the duration of treatment will result in corresponding variations in the extent of gelatinization and hardness of the product. The pebbles are then dried down to about an air-dry condition. This may be accomplished by blowing off the drum until the pressure is reduced to atmospheric and then connecting a vacuum pump to the pipe 26 to draw off the excess of moisture, this preferably being done while the drum continues in rotation. In other words, it is preferred that the drying be accomplished as a continuation of the operation without stopping the drum. The reason for this is that before being dried the pieces or small masses are in a sticky condition, and if the rotation of the drum were discontinued the mass of pieces would settle in the lowermost portion of the drum and as they cooled off would stick together. By continuing the rotation of the drum and drying the mass, the pieces or pebbles continue to tumble about and due to the drying action lose their sticky characteristic so that danger of their sticking together is avoided.

The pebbled product made from corn flour in the manner described may be used as a food by boiling it or otherwise treating it, or it may, if desired, be puffed to convert the same into a cereal breakfast food. Corn flour treated in the manner described herein, especially when the treatment is such that the pebbles are hard and thoroughly cooked having the contained starch substantially completely gelatinized, provides a very desirable breakfast food when puffed, or, the puffed pellets may be candied or sweetened to make a very pleasing confection. Such puffing may be done immediately after the pebbling and drying of the material, or the pebbles may be stored and puffed later. The puffing of the pebbles may be done in accordance with the method forming the subject-matter of my Patent No. 1,035,835, granted August 20th, 1912.

Flour made from rice or wheat, and other flours, like buckwheat, or flours made from legumes, like peas, beans, lentils, are subjected to substantially the same treatment to form the same into pebble-like lumps or pebbles. In each case the flour has sufficient water added to it and thoroughly disseminated throughout so that the resultant is of uniform consistency, forming a doughy or plastic mass. The moisture content should be about 40 to 45 per cent., although, as in the case of corn flour, a reasonable variation in the moisture content will not materially affect the result. Certain vegetables containing starch in sufficient quantity, such as white potatoes or sweet potatoes, when reduced to the proper dough-like or plastic consistency, may likewise be pebbled to produce a pebbled potato product.

In operating with potatoes, the potatoes are first washed and then preferably peeled or skinned, either by hand or by means of a suitable machine. The potatoes may then be desiccated and ground into a flour, and then after water has been added to the flour to bring the moisture content up to about 40 to 45 per cent. and thoroughly mixed, the plastic mass is subdivided into pieces or small masses, and otherwise treated in substantially the same manner as heretofore described with reference to corn flour. Or the potatoes may be cooked as by boiling or steaming. This steaming or cooking may be performed in the drum which is employed for performing the pebbling operation, the heat of the jacket being high enough to bake or steam the potatoes in steam formed out of their own moisture. In this cooking operation the potatoes are heated from about 160° to 216° F. and until they are substantially in the condition of ordinary boiled potatoes. In this state the potatoes would ordinarily have a moisture content in excess of that desired for the pebbling operation and they are therefore preferably dried to reduce the moisture content to about 60 per cent. This drying operation may be carried out by connecting a vacuum pump to the pipe 26, the operation of the vacuum pump being continued until the moisture content is reduced to the proper degree. The potatoes now having a moisture content sufficient to render them plastic, they are then put into the tank 4 for the purpose of subdividing the mass in pieces or small masses, as in the case with the treatment of corn flour. The succeeding operation is likewise substantially the same as that heretofore described with reference to corn flour.

Dry banana flour may likewise be treated in the manner described herein with reference to corn flour. The bananas are first peeled and then desiccated, after which they are ground up into a flour, moisture then being added to bring the moisture content up to about 40 per cent., the treatment thereafter being the same as heretofore described with reference to the treatment of corn flour. Raw bananas may be subjected to substantially the same treatment as that described in connection with the pebbling of potatoes which have been boiled or cooked. The bananas are first peeled and the pulpy mass is subdivided into small pieces, as by means of the device 4, or if the pulpy mass is too moist it may first be dried down to about 60 per cent. moisture content and then treated in accordance with my process. Likewise pure starch intended for laundry or other household purposes, such as to serve for food, may be made into pebbles or lumps by following the same course of procedure. Thus dried starch may be ground into a flour and then have added to it sufficient water to bring its moisture content up to about 40 to 50 per cent., or green starch taken from the runs may be employed as the raw material in carrying out the process of making pebble-like lumps or pebbles. If it is desired that the pebbles or lumps be used for laundry purposes, the subdivided flour-coated doughy or plastic masses are heated in the drum to a pressure of about five pounds, which is equivalent to a temperature of about 160° F., or just sufficient to slightly gelatinize some of the starch. Due to the heating and tumbling action the resulting lumps or pebbles will be sufficiently hard and compact to stand handling and transportation, but readily break down in cold or warm water to form a starch emulsion, so that they may be used for laundry purposes, or they may be puffed to make a puffed product. Or if the doughy pieces or masses are heated to a higher temperature, say to about 225° F., the lumps or pebbles resulting will be hard and horny, the starch being gelatinized substantially throughout the lumps or pebbles, and having polished or glazed peripheries. These pebble-like lumps or pebbles, being cooked throughout, may be used for various purposes. For example they may be made into puddings, a good deal like sago, or they may be puffed to provide a puffed product.

Tapioca, sago, cassava and the like, either in flour form and having water added thereto to bring the moisture content up to about 40 to 45 per cent. so that the mass is doughy or plastic, or when taken in the green condition, that is to say, from the runs, when it is in a plastic condition, may be treated in the same manner as heretofore described with respect to corn flour and starch, to produce pebble-like products capable of the same use as commercial tapioca, sago and cassava, respectively.

The pebble-like lumps made from various starch-containing materials according to the process herein described may be used for various purposes, as, for example, for food when boiled, or they may be puffed to form a puffed product which may be used as a food either in puffed form or be thereafter ground to produce a flour which may likewise be used for food purposes.

It will be obvious from the foregoing that in all the examples given the hardness of the resulting pebbles or pebble-like lumps will depend upon the moisture content, the duration of treatment, and the temperature to which the doughy or plastic pellets are subjected during the heating and tumbling operation. Thus, for example, if a product is desired which will break down in water, as in the case of laundry starch, the mass is heated to the temperature at which starch begins to gelatinize, and the treatment is discontinued before any material portion of the starch has become gelatinized, it being necessary only that there be sufficient gelatinized starch to form a binder to cement the starch particles together and permit them to stand handling and transportation without breaking. If, on the other hand, it is desired to have a product which is to all intents and purposes cooked, the material is heated to a considerably higher temperature and the treatment is continued for a time sufficient to insure substantially complete gelatinization of the starch in the material.

It is to be observed that while I have spoken of heating the material to a temperature sufficiently high during the heating and tumbling action to gelatinize more or less of the contained starch to form a binder to cement or bind the particles together, so that when the process is completed the resulting pebbles will be durable and will stand handling and transportation without crumbling or breaking up, heating to such temperature may be dispensed with if a suitable binder is added in the first instance to the material to be treated. Thus in the case of starch, for example, gelatinized starch in the form of a powder, or the powder or flour made from the puffed starch, as described in my Patent No. 1,035,837 granted August 20th, 1912, may be mixed with the water which is added to the starch to render it plastic, and the gelatinized starch, being thoroughly disseminated throughout the mass by the stirring action in the mixing machine, will serve to cement the particles together during the tumbling action without heating the dough pieces to a gelatinizing temperature.

It has been found in practice that the pressures inside the drum and the temperature of the material resulting from the heating correspond essentially with the standard saturated steam tables. Thus when the pressure in the drum is five pounds the temperature of the material is at about 160° F.

By the word starch-material as used in the claims I include material which consists wholly of starch or which contains a substantial quantity of starch.

Having thus described my invention, what I claim as new and desire to secure by Letters Patent, is—

1. The process of pebbling starch-material which consists in taking such material in a plastic condition and subdividing it into small masses or pieces, and then subjecting the same to heat and a tumbling action to form such masses or pieces into pebble-like lumps.

2. The process of pebbling starch-material which consists in subdividing such material having a moisture content sufficient to render the same plastic into small masses or pieces, and then subjecting such pieces to a heating and tumbling action to form the same into pebble-like lumps.

3. The process of pebbling starch-material which consists in subdividing such material in a plastic state into small masses or pieces, then subjecting such pieces to steam pressure and a tumbling action to form the same into pebble-like lumps.

4. The process of pebbling starch-material which consists in subdividing such material in a plastic state into small masses or pieces, then subjecting such pieces to a heating and tumbling action to form the same into pebble-like lumps, and then drying the pebble-like lumps to air dry condition while continuing the tumbling action.

5. The process described which consists in taking starch-material having sufficient moisture to render the same plastic, subdividing the mass into small masses or pieces and then subjecting such pieces to a heating and tumbling action in a closed receptacle to form the same into pebble-like lumps.

6. The process described, which consists in subdividing starch material in a plastic state into small masses or pieces, coating the subdivided masses or pieces with flour, and then subjecting the flour coated masses or pieces to a heating and tumbling action in a closed receptacle until pressure develops, so as to form such masses or pieces into pebble-like lumps.

7. The process described which consists in taking starch-material in a plastic condition and subdividing the same in transverse directions to form the mass into pieces, and then subjecting the pieces to a heating and tumbling action to form the same into hard pebble-like lumps.

8. The process described which consists in taking starch-material having a moisture content sufficient to render the same plastic and subdividing the plastic mass into small pieces, coating the pieces with flour, and then subjecting the flour-coated plastic pieces to a heating and tumbling action in a closed receptacle until pressure develops so as to form the pieces into pebble-like lumps, and then exhausting the pressure below atmospheric while the tumbling action is continued to dry the pebbles to about air dry condition.

9. The process described, which consists in taking starch-material having a moisture content sufficient to render the same plastic, subjecting the mass to pressure to subdivide the same in one direction, again subdividing the material to form the same into pieces, coating the pieces with flour, and then subjecting the same to a heating and tumbling action to form the same into hard pebble-like lumps.

10. The process described, which consists in taking starch-material having a moisture content sufficient to render the same plastic, subjecting the plastic mass to pressure to subdivide the same in one direction, again subdividing the material to form the same into pieces, coating the pieces with flour, then subjecting the pieces to steam pressure and a tumbling action in a closed receptacle until pressure is developed therein to form the pieces into pebble-like lumps, and then reducing the pressure below atmospheric to dry the pebbles to substantially air-dry condition.

11. The process of converting starch-containing flour into pebble-like lumps which consists in mixing water with the flour to form the same into a plastic mass containing about 40 to 50 per cent. moisture, then subdividing the mass into small pieces, and then subjecting such pieces to a heating and tumbling action to convert the same into pebble-like lumps.

12. The process of converting starch-containing flour into pebble-like lumps which consists in adding water to the flour and mixing the same to form a dough having a moisture content of from about 40 to 50 per cent., subdividing the mass into small pieces, coating the pieces with flour, then subjecting the pieces in a closed receptacle to a tumbling action and heating the same until steam pressure develops within the receptacle to a temperature sufficient to gelatinize some of the contained starch, whereby the pieces are formed into pebble-like lumps, and then reducing the pressure within the receptacle while the tumbling operation is continued to dry the pebbles to substantially air-dry condition.

13. The process of converting starch-containing flour into pebble-like lumps which consists in adding water to the flour to bring its moisture content to about 40 to 50 per cent., mixing the mass to convert the same into dough, subjecting the mass to a pressing and a cutting action to form the same into pieces, then subjecting the pieces to a heating and tumbling action which is continued until the contained starch is substantially completely gelatinized and pebble-like lumps are formed, and then drying the pebbles in a vacuum while continuing the tumbling action.

In witness whereof, I have hereunto subscribed my name in the presence of two witnesses.

ALEXANDER P. ANDERSON.

Witnesses:
MABEL REYNOLDS,
CHARLES G. COPE.